United States Patent
Hansen et al.

(10) Patent No.: US 9,261,388 B2
(45) Date of Patent: Feb. 16, 2016

(54) METHODS AND SYSTEMS TO MEASURE FLUID FLOW

(71) Applicant: TRANE INTERNATIONAL INC., Piscataway, NJ (US)

(72) Inventors: William G. Hansen, Coon Valley, WI (US); Lane A. Liudahl, Holmen, WI (US)

(73) Assignee: TRANE INTERNATIONAL INC., Piscataway, NJ (US)

( * ) Notice: Subject to any disclaimer, the term of this patent is extended or adjusted under 35 U.S.C. 154(b) by 0 days.

(21) Appl. No.: 14/414,332

(22) PCT Filed: Jul. 11, 2013

(86) PCT No.: PCT/US2013/050066
§ 371 (c)(1),
(2) Date: Jan. 12, 2015

(87) PCT Pub. No.: WO2014/011871
PCT Pub. Date: Jan. 16, 2014

(65) Prior Publication Data
US 2015/0177031 A1     Jun. 25, 2015

Related U.S. Application Data

(60) Provisional application No. 61/670,333, filed on Jul. 11, 2012.

(51) Int. Cl.
G01F 7/00 (2006.01)
G01F 1/34 (2006.01)
F24F 11/00 (2006.01)
F24F 13/02 (2006.01)
G01F 1/36 (2006.01)

(52) U.S. Cl.
CPC .............. *G01F 1/34* (2013.01); *F24F 11/001* (2013.01); *F24F 13/02* (2013.01); *G01F 1/363* (2013.01); *F24F 2011/0038* (2013.01)

(58) Field of Classification Search
None
See application file for complete search history.

(56) References Cited

U.S. PATENT DOCUMENTS

| 4,344,330 A | 8/1982 | Renken et al. |
| 4,735,100 A | 4/1988 | Hajto |
| 4,817,863 A | 4/1989 | Bragg et al. |

(Continued)

FOREIGN PATENT DOCUMENTS

| WO | 91/06831 | 5/1991 |
| WO | 02/090897 | 11/2002 |
| WO | 2006/060185 | 6/2006 |

OTHER PUBLICATIONS

International Search Report and Written Opinion for International Application No. PCT/US2013/050066, dated Oct. 16, 2013, 11 pgs.

*Primary Examiner* — Harshad R Patel
(74) *Attorney, Agent, or Firm* — Hamre, Schumann, Mueller & Larson, P.C.

(57) ABSTRACT

Methods and systems to measure a volumetric fluid flow rate through a fluid flow passage, such as an air handler of a HVAC system, are described. The method may include obtaining a flow rate measurement in a measuring section, and calculating a total flow rate based on a correlation between the obtained flow rate measurement and the total flow rate. The method may also include blocking a portion of the fluid flow passage so that when a minimal volumetric fluid flow rate is provided, the flow rate measurement obtained in the measuring section is at about a minimal sensitivity flow rate requirement.

2 Claims, 7 Drawing Sheets

(56) References Cited

U.S. PATENT DOCUMENTS

| | | |
|---|---|---|
| 5,674,125 A | 10/1997 | Xia et al. |
| 5,741,180 A | 4/1998 | Xia et al. |
| 5,847,288 A | 12/1998 | Hutchinson |
| 6,471,136 B1 | 10/2002 | Chatterjee et al. |
| 6,699,119 B2 | 3/2004 | Boulanger et al. |
| 6,756,571 B2 | 6/2004 | Saikalis et al. |
| 2002/0029629 A1 | 3/2002 | Uramachi et al. |
| 2009/0235757 A1 | 9/2009 | Garnett et al. |

METHODS AND SYSTEMS TO MEASURE FLUID FLOW

FIELD OF TECHNOLOGY

Embodiments disclosed herein relate generally to methods and systems to measure a volumetric fluid flow rate through a fluid passage. More particularly, the embodiments disclosed here relate to measuring volumetric airflow in, for example, an air handler of a heating, ventilation and air conditioning (HVAC) system, such as a rooftop HVAC system.

BACKGROUND

Some applications and apparatuses may require measuring a volumetric fluid flow rate through a fluid passage, such as a conduit or duct. For example, in a rooftop HVAC system, it is often desirable to know the volumetric airflow that the rooftop HVAC system brings into a building in real time. One example of an airflow monitoring system for a HVAC system is the Traq™ airflow monitoring system manufactured by the Trane Company (LaCross, Wis., U.S.A.). The Traq™ airflow monitoring system typically Includes an airflow sensor, such as described in U.S. Pat. No. 4,344,330, in an airflow modulation device, such as described in U.S. Pat. Nos. 5,741,180 and 5,674,125. In each Traq™ airflow monitoring system, the airflow sensor can measure the volumetric airflow through the airflow modulation device. An air intake conduit of the HVAC system may be equipped with one or more Traq™ airflow monitoring systems, so that essentially the entire air intake by the HVAC system may go through the Traq™ airflow monitoring system(s). The total volumetric air intake flow then can be calculated by adding the volumetric airflow values measured by individual Traq™ airflow monitoring system.

SUMMARY

HVAC systems of different capacities may require different minimal volumetric flow intake. Generally, a HVAC system with a larger capacity may require a minimal volumetric airflow that is higher than one with a smaller capacity.

In addition, it may be desirable that a fluid flow measuring device of an apparatus, such as the Traq™ airflow monitoring system of a HVAC, comply with certain industrial standards for measuring accuracy. For example, to be in compliance with applicable Leadership in Energy and Environment Design (LEED) requirements, the HVAC system may have to be equipped with "a direct outdoor airflow measurement device capable of measuring the minimum outdoor airflow rate with an accuracy of plus or minus 15% of the design minimum outdoor air rate, as defined by ASHRAE 62.1-2004."

Methods and systems to help measure a volumetric fluid flow rate through a fluid flow passage are described herein. In some embodiments, a fluid flow passage may include a fluid flow-through passage, a fluid flow measuring passage equipped with a flow rate measuring device, and a partition that generally defines the fluid flow-through passage. In some embodiments, the partition may be configured so that, when the fluid flow passage carries a minimal volumetric fluid flow, the fluid rate through the fluid flow measuring passage is at about a minimal sensitivity flow rate. The minimal sensitivity flow rate may be determined, for example, by accuracy/sensitivity of the flow rate measuring device. The embodiments as disclosed herein can help conduct a fluid flow measurement that complies with, for example, industry accuracy requirements, and the measurement can be taken in the fluid flow measuring passage that may occupy only a portion of the fluid flow passage.

In some embodiments, the minimal volumetric fluid flow rate may be determined, for example, by specifications of an apparatus and/or applications that employ the fluid flow passage, such as for example HVAC air handlers, and/or duct systems. In some embodiments, the minimal sensitivity flow rate requirement may be determined by a measurement accuracy and/or sensitivity of the fluid flow measuring device. The method may also include blocking a portion of the fluid flow passage so that when the minimal volumetric fluid flow rate is provided to the fluid flow passage, the flow rate in the measuring section is at about the minimal sensitivity flow rate.

In some embodiments, a fluid flow passage may include a measuring section and a by-pass/flow-through section. A method of measuring the volumetric fluid flow rate may include obtaining a flow rate measurement in the measuring section of the fluid flow passage by measuring a parameter of the fluid flow (e.g. a pressure drop), obtaining a flow rate through the fluid flow passage by plotting the measured parameter value in the fluid measuring section against, for example, a predetermined correlation (e.g. correlation graphs or lookup tables) between the parameter value and the flow rate in the by-pass/flow-through section. The total flow rate may be determined by adding up the flow rates in the measuring section and the by-pass/flow-through section.

In some embodiments, the methods and systems to measure a volumetric fluid flow rate described herein may be adopted for an air intake (e.g. air handler) of a HVAC system, which may include an airflow measuring passage, an airflow flow-through passage, and a partition defining the airflow flow-through passage. In some embodiments, the HVAC system may have a minimal volumetric air intake requirement, and the airflow measuring passage may have a minimal air pressure drop requirement. In some embodiments, the partition may be configured so that when the air intake conduit is provided with the minimal volumetric air intake, the airflow measuring passage is at about the minimal air pressure drop.

BRIEF DESCRIPTION OF THE DRAWINGS

FIG. 2A is a side view. FIG. 2B is a sectional view from line A-A in FIG. 2A.

FIG. 5A is a front perspective view. FIG. 5B is a back perspective view.

DETAILED DESCRIPTION

Figure 1:
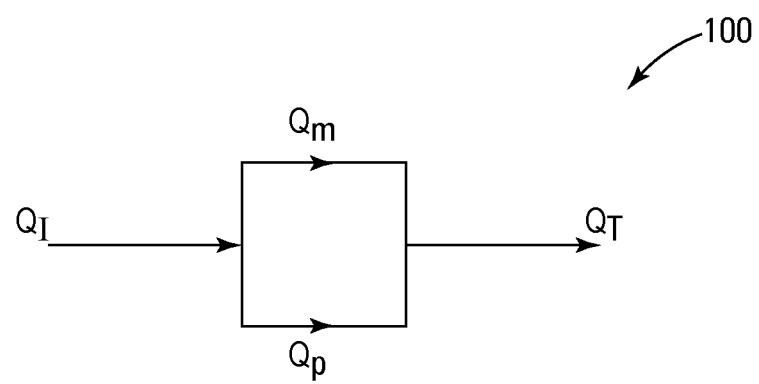
FIG. 1 illustrates a method to obtain a volumetric measurement of a fluid flow.

Measuring volumetric fluid flow, such as measuring volumetric air intake for a rooftop HVAC system is often desirable. Many fluid flow measuring devices have been developed to measure the volumetric fluid flow. For example, a Traq™ airflow monitoring system by the Trane Company is designed for measuring a rate of the airflow intake of a HVAC system.

In the Traq™ airflow monitoring system, an airflow measuring device is configured to measure an air pressure drop in the airflow, which may correlate to a speed of the airflow through an airflow modulation device. The airflow speed may correlate to a volumetric rate of the air flowing through the airflow modulation device. By measuring the air pressure drop, the volumetric rate of the airflow through the Traq™ airflow monitoring system can be obtained.

On the other hand, to get an accurate fluid flow measurement, for example, required by an industrial standard, the fluid flow measuring devices may have to meet a certain minimum requirement. For example, in the Traq™ airflow monitoring system, the air pressure drop measuring device may require a minimal air pressure drop for the device to measure the airflow within an accuracy defined by ASHRAE 62.1-2004. If the air pressure drop is below the minimal requirement, the measurement by the Traq™ airflow monitoring system may not meet the accuracy defined by ASHRAE 62.1-2004.

Methods and systems to measure a volumetric fluid flow rate through a fluid flow passage are described herein. In some embodiments, a fluid flow passage may include a flow measuring passage, a flow-through passage, and a partition that generally defines the flow-through passage. In some embodiments, the fluid flow passage may be provided with a minimal flow rate that is, for example, required by applications of the fluid flow passage, such as a HVAC system air handler. In some embodiments, the partition may be configured so when the fluid flow passage carries the minimal flow rate, a flow rate measured in the flow measuring passage may be at about a minimal sensitivity flow rate that is, for example, required by accuracy and/or sensitivity of a flow measuring device. In some embodiments, a method of measuring the volumetric fluid flow rate may include obtaining a flow rate measurement in a measuring section of the fluid flow passage by measuring a parameter of the fluid flow, and obtaining a flow rate through the flow-through passage based on a predetermined correlation between the parameter value in the measuring section and the flow rate in the flow-through passage. A total flow rate through the fluid flow passage may be calculated by adding up the flow rate measured in the measuring section and the flow rate obtained by the correlation between the measured parameter value and the flow rate in the flow-through area. In some embodiments, the methods and systems as described herein may be adopted for an air intake (i.e. air handler) of a HVAC system.

References are made to the accompanying drawings that form a part hereof, and in which is shown by way of illustration of the embodiments in which the embodiments may be practiced. It is to be understood that the terms used herein are for the purpose of describing the figures and embodiments and should not be regarded as limiting the scope of the present application. Terms such as "flow rate," "volumetric flow rate," "volumetric rate," "fluid flow rate," are all referred to an amount of fluid flow-through a conduit or passage in a certain period of time. These terms are interchangeable.

FIG. 1 illustrates a method of measuring a total volumetric fluid flow rate $Q_T$ through a fluid flow passage 100. As illustrated, in a fluid flow passage, an inward fluid flow $Q_I$ can be split into a measuring fluid flow $Q_m$ and a by-passing fluid flow $Q_p$. A fluid flow measuring device may be positioned in the measuring fluid flow $Q_m$ and can be configured to measure the volumetric fluid flow rate value of $Q_m$ by, for example, measuring at least one parameter of the fluid flow, such as a pressure drop in the fluid flow. The by-passing fluid flow $Q_p$ generally is not equipped with a volumetric fluid flow rate measuring device. The volumetric fluid flow rate of $Q_p$ may be obtained, for example, by plotting a measured parameter value in $Q_m$ against a predetermined correlation (e.g. correlation graphs or look-up tables) between the parameter value and the volumetric fluid flow rate of $Q_p$. The total fluid flow $Q_T$ can be obtained by adding up the measured $Q_m$ value and the $Q_p$ value obtained.

It is to be appreciated that the volumetric fluid flow rate can also, for example, be measured by a hot wire meter, a vane meter, a coriolis meter or other suitable devices.

Figure 2A:
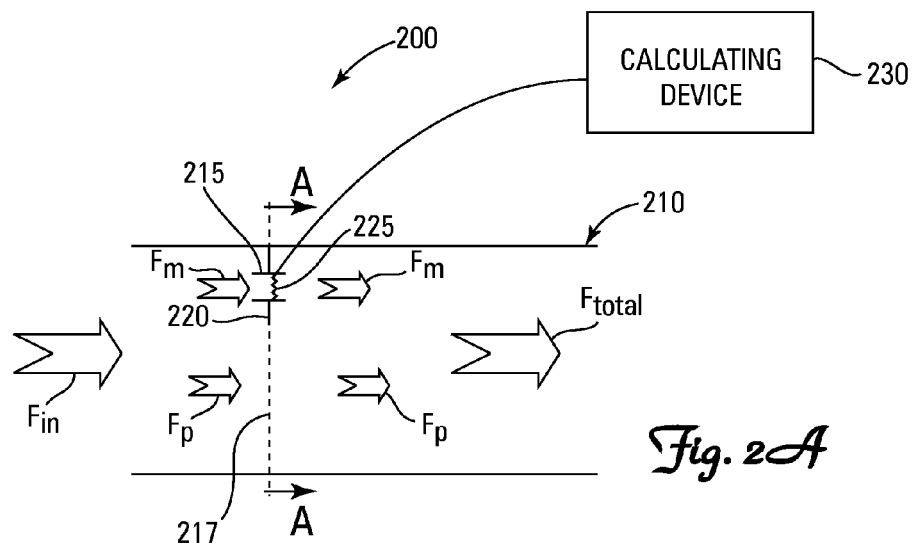
FIGS. 2A and 2B illustrate a schematic view of a fluid flow passage that includes a volumetric fluid flow rate measuring device.
Figure 2B:
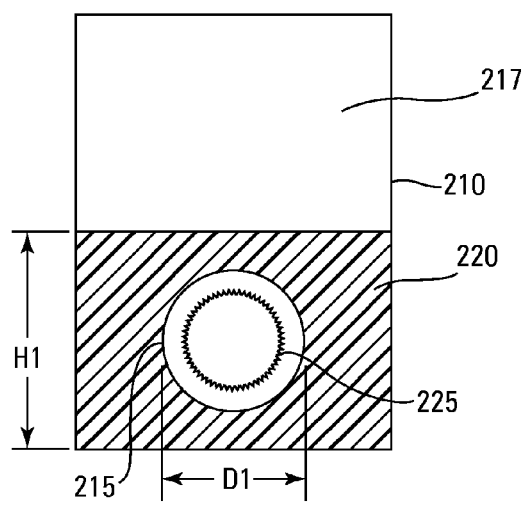

Referring to FIGS. 2A and 2B, an embodiment of a section of a fluid flow passage 200 configured to measure a total fluid flow rate $F_{total}$ through the fluid flow passage 200 is described. The fluid flow passage 200 includes a conduit 210, a fluid flow measuring passage 215, a fluid flow-through passage 217 and a partition 220 that generally accommodates the fluid flow measuring passage 215 and defines the fluid flow-through passage 217. The fluid flow measuring passage 215 includes a fluid flow measuring device 225 that is generally configured to measure a volumetric fluid flow rate through the fluid flow measuring passage 215. The fluid flow measuring device 225 is coupled with a calculating device 230 that is configured to determine the volumetric fluid rate flowing through the fluid flow measuring passage 215. In some embodiments, the calculating device 230 may also be configured to determine the total volumetric fluid flow rate $F_{total}$ through the conduit 210. The fluid flow-through passage 217 is generally configured to allow at least some of the fluid flow to by-pass the fluid flow measuring passage 215. By-passing the fluid flow measuring passage 215 may help reduce a pressure drop in the fluid flow passage 200.

Referring to FIG. 2B, a sectional view along a line A-A of FIG. 2A is illustrated. The conduit 210 of the embodiment as described in FIGS. 2A and 2B generally has a rectangular cross section. It is to be appreciated that the shape is exemplary, and the shape of the cross section of the conduit 210 can be any other suitable shape. The cross section of the conduit 210 includes the fluid flow measuring passage 215 and the fluid flow-through passage 217. The partition 220 generally accommodates the fluid flow measuring passage 215 and defines the fluid flowing passage 217. The fluid flow measuring passage 215 may be equipped with the fluid flow measuring device 225. The partition 220 has a height H1. The fluid flow measuring passage 215, which can have a circular outline in the embodiment described, has a diameter D1. The partition 220 can block at least a portion of the conduit 210.

Please note the shape and configuration as described herein are all exemplary. The partition 220 and the fluid flow measuring passage 215 may be configured to have other configurations.

Referring back to FIG. 2A, a method of measuring the total volumetric fluid flow rate $F_{total}$ in the conduit 210 is described. The conduit 210 receives a fluid flow $F_{in}$, which is divided into a fluid flow $F_m$ that flows through the fluid flow measuring passage 215 and a fluid flow $F_p$ that flows through the fluid flow-through passage 217. The fluid flows $F_m$ and $F_p$ are combined into the $F_{total}$ in the conduit 210. The fluid flow measuring device 225 is configured to measure at least one parameter (e.g. a pressure drop in the $F_m$) of the $F_m$ that flows through the fluid flow measuring passage 215, and then the calculation device 230 may determine the $F_m$ based on a correlation established between the parameter value and the volumetric flow rate of $F_m$. The calculation device 230 may also use a correlation established between the parameter value and the volumetric flow rate of $F_p$, and/or $F_{total}$ to obtain $F_p$ and/or $F_{total}$.

Figure 3:
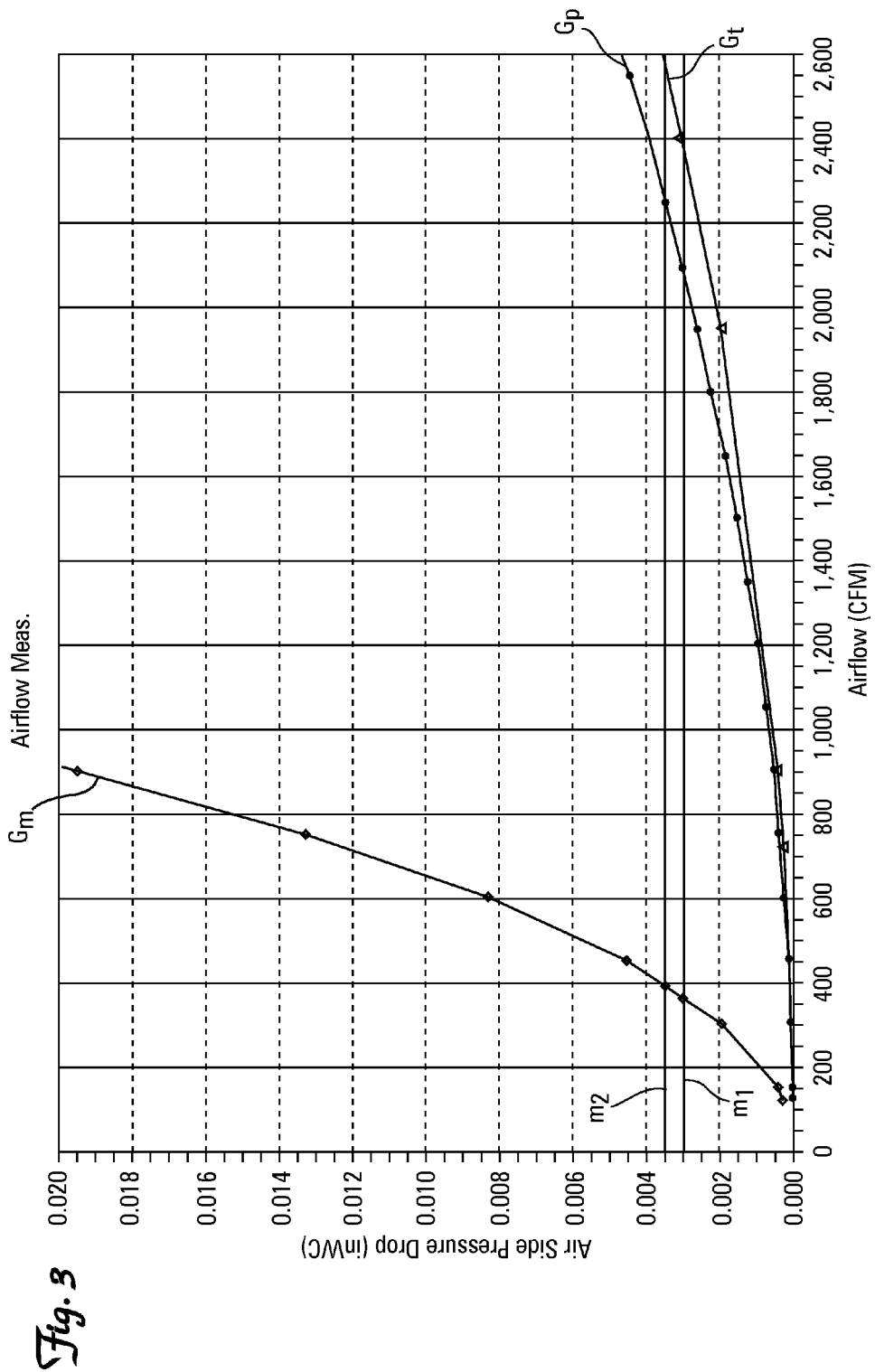
FIG. 3 illustrates an example of a correlation between an airflow rate measurement by an airflow measuring device and a total airflow rate in an airflow passage.

One example of a correlation that can be used to obtain a total airflow in a conduit configured similarly to the embodiments as illustrated in FIGS. 2A and 2B, and/or similarly to the air intake for a HVAC system as described later in FIGS. 5A and 5B below is illustrated in FIG. 3. Generally, the conduit includes an airflow measuring passage and an airflow flow-through passage. The vertical axis in FIG. 3 corresponds to an air side pressure drop in inch water column (inWC), which is a parameter of the airflow that can be measured by an airflow measuring device (e.g. the fluid flow measuring device 225 in FIG. 2). The horizontal axis in FIG. 3 corresponds to a volumetric airflow rate in cube feet per minute (CFM). Line $G_m$ illustrates a correlation between different air pressure drop values and different volumetric rates of air flowing through the measuring passage; and line $G_p$ illustrates a correlation between different air pressure drops and different volumetric rates of air flowing through the flow-through passage. For example, the air side pressure drop of about 0.003 inWC corresponds to about 350 CFM of airflow flowing through the measuring passage, which is indicated in FIG. 3 by the intersecting point between line m1 (which represents a pressure drop of about 0.003 inWC) and $G_m$. Accordingly, the pressure drop of about 0.003 inWC corresponds to about 2,100 CFM of air flowing through the flow-through passage. The correlations represented by these two lines $G_p$ and $G_m$ can be obtained, for example, by testing and/or measuring different air pressure drop values when different airflow rates are provided to the measuring passage and the flow-through passage respectively in a wind tunnel.

In operation, in the conduit that includes both the measuring passage and the flow-through passage, measurements of the air side pressure drop in the measuring passage can be obtained by an air pressure metering device, such as an average fluid flow sensor as described in U.S. Pat. No. 4,344,330. The volumetric airflow through the measuring passage can be obtained by plotting the measured air pressure drop on $G_m$. Further, because the flow-through passage has a similar air pressure drop as the measuring passage, the volumetric airflow through the flow-through passage can also be determined by plotting the measured air pressure drop on $G_p$. The total airflow in the conduit can be calculated as the sum of the volumetric airflow through the measuring passage and the volumetric airflow through the flow-through passage.

For example, as illustrated in FIG. 3, in the conduit, if the measurement in the measuring passage is about 0.003 inWC, it can be determined that the rate of air flowing through the measuring passage is about 350 CFM and the rate of air flowing through the flow-through passage is about 2100 CFM, and consequently the calculated total volumetric airflow in the conduit is about 2450 CFM, as illustrated by intersecting points between $G_m$, $G_p$ and line m1 respectively. If the measurement is about 0.0035 inWC (which is represented in FIG. 3 by line m3), then the volumetric airflow through the measuring passage and the flow-through passage is about 400 CFM and 2250 CFM respectively, as illustrated by intersecting points between $G_m$, $G_p$ and line m2 respectively. Consequently, the calculated total volumetric airflow in the conduit is about 2650 CFM.

In another embodiment, the correlation between the air side pressure drop values in the measuring passage and the total volumetric airflow rates through the conduit including both the measuring passage and the flow-through passage can be established by, for example, in a wind tunnel. One example of the correlation is illustrated as $G_t$ in FIG. 3. Gt can be obtained by, for example, putting the conduit including both the measuring passage and the flow-through passage in a wind tunnel, and measure the pressure drops in the conduit when the conduit is provided with different rates of airflow in the wind tunnel. With this method, the air pressure drop measurement in the measuring passage can be directly correlated to the total volumetric airflow in the conduit. For example, when the measurement of the air pressure drop in the measuring passage is about 0.003 inWC, the total airflow in the conduit is about 2,400 CFM as determined by the intersecting point of the lines m1 and $G_t$.

The calculation and/or determination of the total volumetric airflow in the conduit may be performed by a suitable processor, such as the calculation device 230 as illustrated in FIG. 2A.

It is to be appreciated that the principle as described herein may not only be suitable for measuring a volumetric rate of an airflow, but may also be suitable for measuring flow rates of other gaseous and/or liquid fluids.

Referring back to FIG. 2B, as discussed above, the fluid flow measuring device 225 may require a minimal sensitivity fluid flow rate to meet a certain measuring accuracy/sensitivity requirement. If the fluid flow flowing through the measuring device 225 is below the minimal sensitivity fluid flow rate, the measuring device 225 may not obtain an accurate value, or satisfy a measuring sensitivity requirement of the measuring device 225. In addition, in some applications or apparatuses, such as a rooftop HVAC system, the $F_{total}$ may have to meet a minimal volumetric fluid flow rate requirement. If the fluid flow $F_{total}$ is below the minimal volumetric fluid flow rate requirement, the apparatus may not work properly.

As illustrated in FIG. 2B, the partition 220 has the height H1 and the fluid flow measuring passage has the diameter D1. The height H1 and the diameter D1 may be configured to modulate the fluid flow rate through the fluid flow measuring passage 215 and the flow-through passage 217. Often, the diameter D1 of the fluid flow measuring passage 215 can be predetermined, and may be constant and therefore not likely to change. For example, if a Traq™ airflow monitoring system is used as the fluid flow measuring device 225, because the monitoring system is manufactured in a factory, the diameter of the monitoring system (e.g. the diameter D1) may already be set and may be difficult to change. However, the height H1 can be changed to modulate the fluid flow rate through the fluid flow measuring passage 215 and the flow-through passage 217.

Generally, increasing the height H1 of the partition 220 can increase a size of the partition 220, causing a larger portion of the fluid flow passage 200 to be blocked by the partition 220. If $F_{total}$ maintained, increasing the height H1 of the partition 220 may increase the volumetric fluid flow rate (thus increase the fluid flow pressure drop) in the fluid flow measuring passage 215. Conversely, decreasing the height H1 of the partition 220 can decrease a size of the partition 220, causing a smaller portion of the fluid flow passage 200 to be blocked by the partition 220. If $F_{total}$ is maintained, decreasing the height H1 of the partition 220 may decrease the volumetric fluid flow rate (thus decrease the fluid flow pressure drop) in the fluid flow measuring passage 215. In some embodiments, the height H1 (and thus the size of the partition 220) may be configured so that when a minimal volumetric fluid flow rate of $F_{total}$ is provided in the conduit 210, a minimal sensitivity fluid flow rate satisfying a measurement accuracy and/or sensitivity requirement in the fluid flow measuring passage 215 may be obtained.

It is to be noted that the partition 220 can be any shape. In general, the partition 220 may be configured to accommodate the fluid flow measuring passage 215, and the size of the partition 220 may be configured to block at least a portion of the fluid flow passage 200, thus defining the size of the fluid flow-through passage 215.

Figure 4:
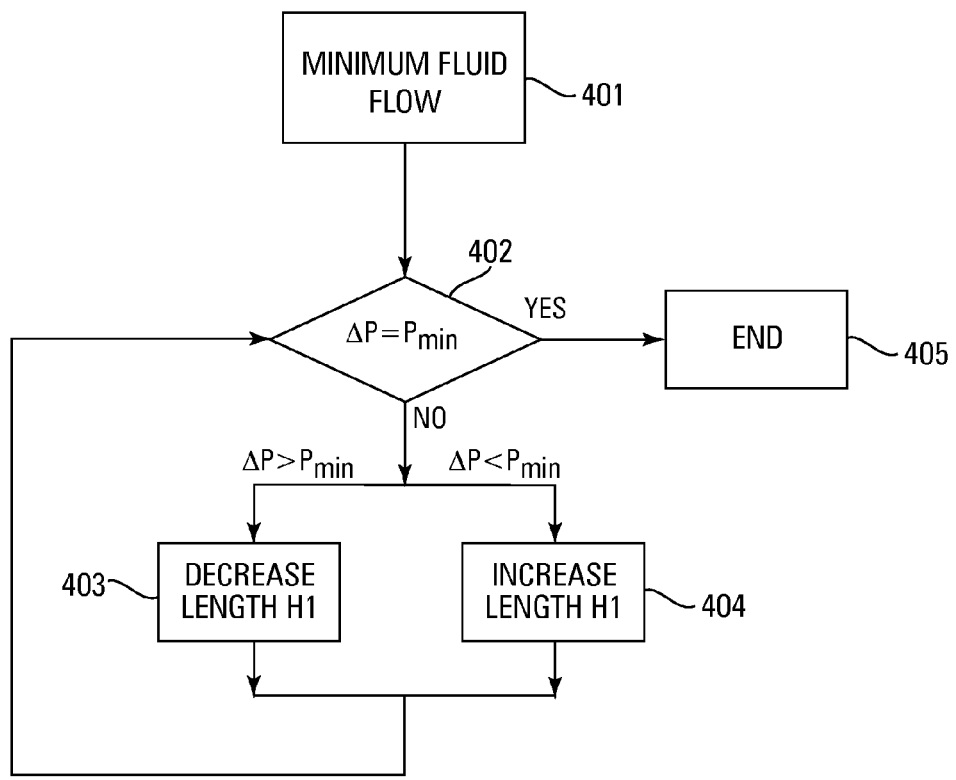
FIG. 4 illustrates a method to configure a partition of a fluid flow passage.

A process to configure the height H1 (or the size of the partition 220) in the conduit 210 as illustrated in FIG. 2A is illustrated in FIG. 4. The process can help configure the height H1 so that, for example, when a minimal volumetric fluid flow rate for $F_{total}$ is provided in the conduit 210, the fluid flow measuring passage 215 may have an air pressure drop that is at about a minimal air pressure drop $P_{min}$ that meets, for example, a measuring accuracy/sensitive requirement.

At 401, the process is configured to provide a minimal volumetric fluid flow rate for $F_{total}$ in the conduit 210. This minimal volumetric fluid flow rate may be predetermined based on applications and/or apparatuses. For example, in a rooftop HVAC system, a minimal volumetric air intake requirement may be correlated to the capacity of the HVAC system. In one example, the minimal volumetric air intake may be about 40 CFM per ton of cooling load of the HVAC system. Thus, the minimal total volumetric airflow of a HVAC system with 60-ton of cooling load is about 2,400 CFM.

The fluid flow measuring device 225 may be configured to measure a pressure drop ΔP in the fluid flow measuring passage 215. Generally, the pressure drop ΔP correlates to a speed of the fluid flow and thus a volumetric rate of the fluid flow. A higher pressure drop ΔP is generally associated with a higher volumetric rate of the fluid flow. At 402, the fluid pressure drop ΔP in the fluid flow measuring passage 215 is compared to a minimal air pressure drop P. The minimal air pressure drop $P_{min}$ may be determined, for example, by the sensitivity and/or accuracy of the fluid flow measuring device 225.

If the pressure drop ΔP is larger than the minimal pressure drop $P_{min}$, which indicates that the speed (and the volumetric rate) of the fluid flow in the fluid flow measuring passage 215 is higher than the speed (and the volumetric rate) required to achieve the minimal pressure drop $P_{min}$, the process goes to 403. At 403, the height H1 of the partition 220 is reduced so as to increase the size of the fluid flow-through passage 217. If the pressure drop ΔP is smaller than the minimal pressure drop $P_{min}$, which indicates that speed of the fluid flow in the fluid flow measuring passage 215 is less than the speed to achieve the minimal pressure drop $P_{min}$, the process goes to 404. At 404, the height H1 of the partition 220 is increased to reduce the size of the fluid flow-through passage 217. The process can repeat 402, 403 and/or 404 until ΔP is about the same as $P_{min}$. The process then exits at 405, and the height H1 of the partition 220 for the fluid flow passage 215 is determined to achieve about the $P_{min}$ required for, for example, measuring accuracy and/or sensitivity, when the $F_{total}$ is at about the minimal volumetric fluid flow. The process as illustrated in FIG. 4 can help minimize the pressure drop in the fluid flow while achieving relatively accurate volumetric fluid flow rate measurements in the fluid flow passage 215. In addition, the process as illustrated in FIG. 4 can help ensure accurate measurement of the minimal total fluid flow $F_{total}$.

Figure 5A:
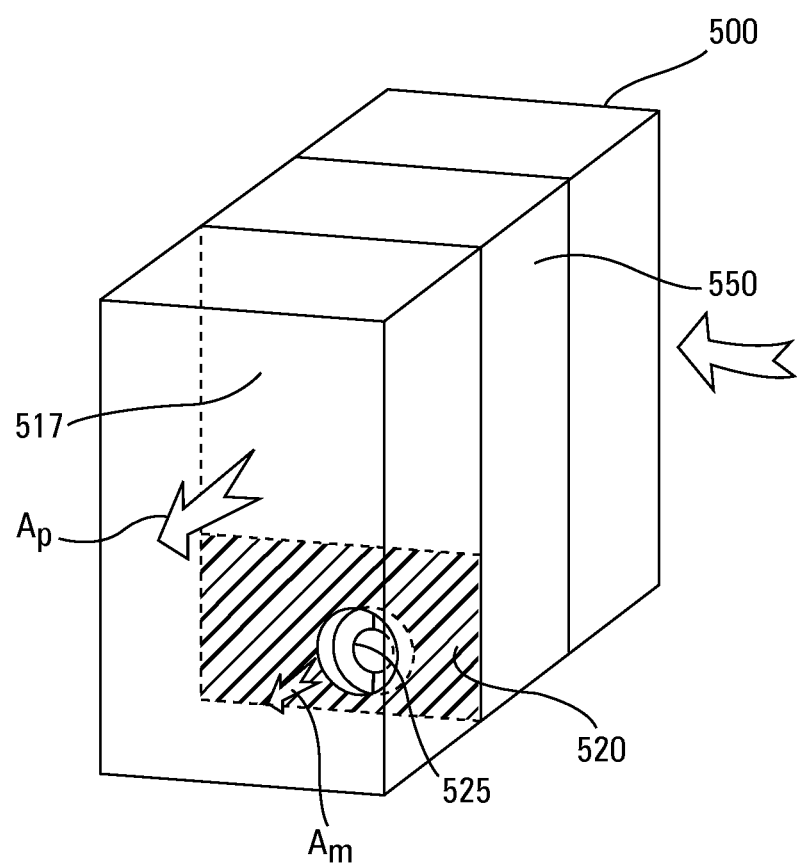
FIGS. 5A and 5B illustrate an air intake of a HVAC system with one airflow measuring device.
Figure 5B:
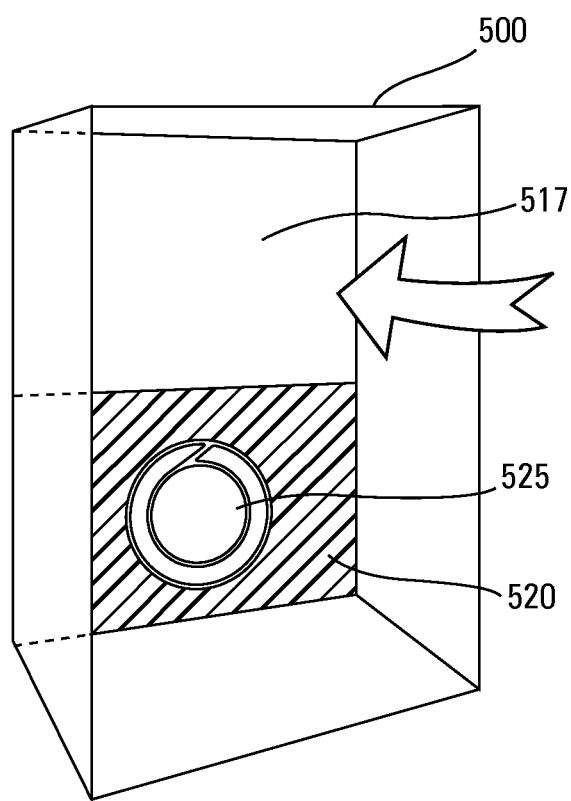

FIGS. 5A and 5B illustrate an embodiment of a conduit 500 with a fluid flow measuring device 525 that is configured for measuring a volumetric airflow of a HVAC system, e.g. in an air handler of a HVAC system. The conduit 500 has an air intake 550 that is in communication with the environment. The conduit 500 also includes the volumetric airflow measuring device 525, a partition 520 and an airflow flow-through passage 517. The volumetric airflow measuring device 525 may be a Traq™ airflow monitoring system that is equipped with an airflow measuring sensor that is capable of measuring an air pressure drop. The partition 520 may be a sheet metal. The size of the partition 520 can be configured so that a total air intake $A_{total}$ is at about a minimal air intake requirement for the HVAC system when the airflow $A_m$ is at about a minimal air pressure drop required, for example, for an accurate and/or sensitive volumetric airflow measurement by the airflow measuring device 525. The total air intake $A_{total}$ in FIG. 5A is the sum of an airflow $A_p$ that flows through the airflow flow-through passage 517 and the airflow $A_m$ that flows through the airflow measuring device 525.

Figure 6:
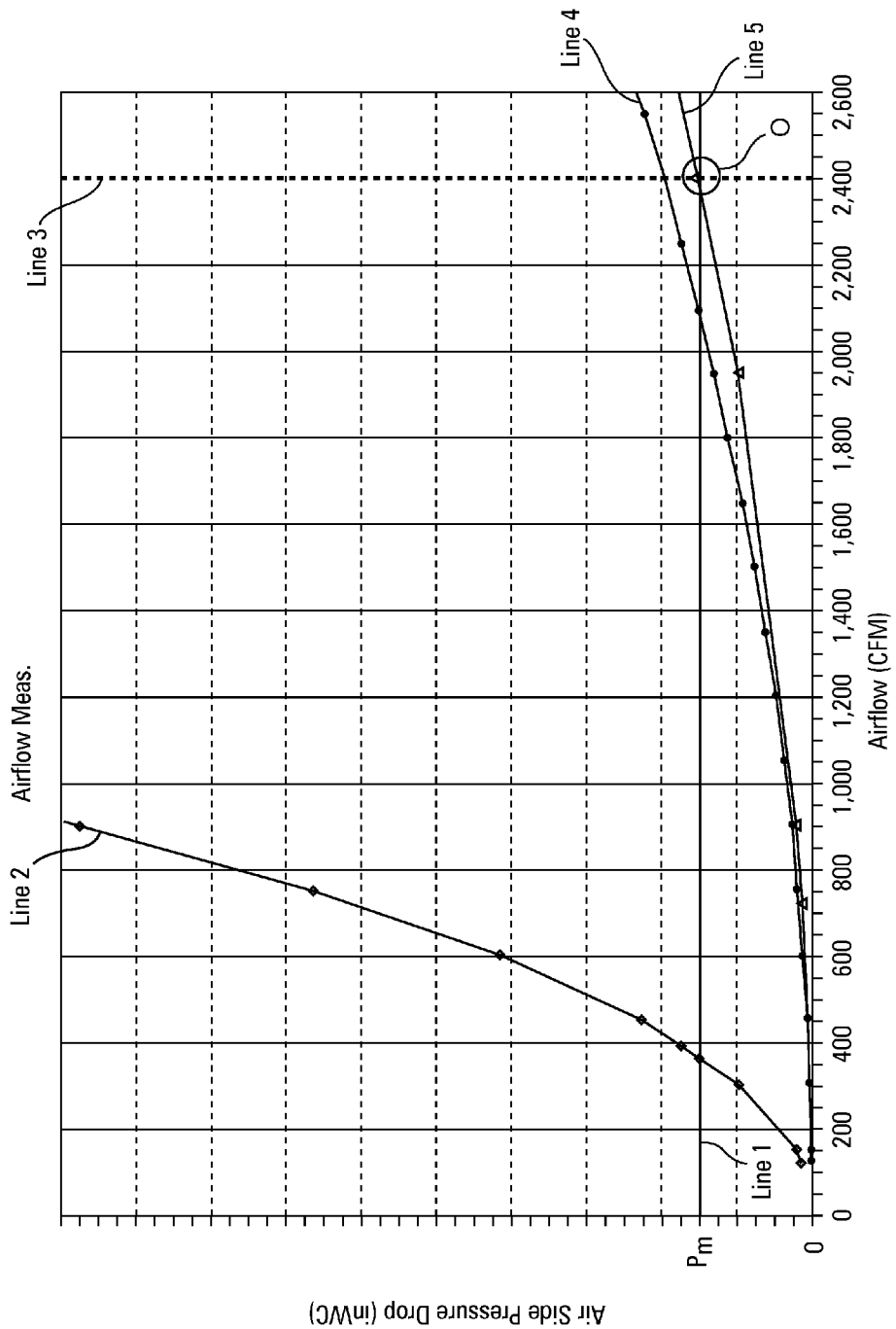
FIG. 6 illustrates an airflow measurement in an air intake of a HVAC system with an airflow measuring device.

FIG. 6 illustrates testing data in an airflow conduit of a 60-ton rooftop HVAC system. The conduit can be configured similarly to the conduit 500 that is illustrated in FIGS. 5A and 5B. The conduit has one Traq™ airflow monitoring system, a flow-through passage and a partition. The conduit has a predetermined minimal sensitivity air pressure drop requirement $P_m$, which is illustrated in FIG. 6 by Line 1. This minimal requirement may be determined, for example, by testing sensitivity/accuracy of the Traq™ airflow monitoring system with various rates of airflow, and can be provided by, for example, the manufacturer. Line 2 illustrates a correlation between the air pressure drop and the volumetric airflow in the Traq™ airflow monitoring system. Line 3 illustrates a minimal air intake requirement for the 60-ton HVAC system, which is about 2,400 CPM. Line 4 illustrates a correlation between the air pressure drop and volumetric airflow for the flow-through passage area. Line 5 illustrates a correlation between the air pressure drop and a total volumetric airflow through the entire conduit. A size of the partition is configured so that Lines 1, 3 and 5 all intersect at about one point, e.g. point O in FIG. 6, which indicates that when the total airflow of the HVAC system is at the minimal air intake requirement (about 2,400 CPM), the air pressure drop in the measuring passage is at about the minimal air pressure drop requirement (about $P_m$). It is to be appreciated that when the total airflow of the HVAC system is at the minimal air intake requirement, the air pressure drops in the measuring passage that is above the minimal air pressure drop requirement (i.e. Pm) may also be acceptable. Configuring the partition as described above can help achieve an accurate and/or sensitive airflow measurement when the air intake is at the minimal level, and may also help minimize air pressure drop in the total airflow through the conduit.

It is appreciated that the methods, systems and principles as described herein can be adapted to any fluids, including air, gas, water or refrigerant.

Any aspects 1 and 2 can be combined with any aspects 3-7. Any aspects 3-5 can be combined with any aspects 6-7.

Aspect 1. A fluid flow passage comprising:
a flow-through passage;
a fluid flow measuring passage;
a flow rate measuring device positioned in the fluid flow measuring passage; and
a partition defining the flow-through passage,
wherein the fluid flow measuring device has a minimal sensitivity flow rate requirement, and when the fluid flow passage has a minimal total flow rate, the partition is configured so that the fluid flow measuring passage has the minimal sensitivity flow rate requirement.

Aspect 2. The fluid flow passage of aspect 1, wherein the partition has a height relative to a side of the fluid flow passage, and the fluid flow measuring passage is defined within the partition.

Aspect 3. An air intake conduit of a HVAC system comprising:
an airflow measuring passage;
an airflow flow-through passage; and
a partition defining the airflow flow-through passage;

wherein the airflow measuring passage is configured to measure an air pressure drop in the airflow measuring passage and has a minimal air pressure drop requirement, the air intake conduit has a minimal volumetric air intake requirement, and the partition is configured so that when the air intake conduit has the minimal volumetric air intake, the air pressure drop measured at the airflow measuring passage is at the minimal air pressure drop requirement.

Aspect 4. The air intake conduit of aspect 3, wherein the airflow measuring passage is equipped with an airflow sensor configured to measure volumetric airflow through the airflow measuring passage.

Aspect 5. The air intake conduit of aspects 3-4, wherein the partition has a height relative to a side of the fluid flow passage, and the fluid flow measuring passage is defined within the partition.

Aspect 6. A method to measure total volumetric fluid flow rate through a fluid flow passage comprising:
  obtaining a fluid flow parameter value in a measuring section of the fluid flow passage;
  obtaining a volumetric fluid flow rate by plotting the parameter value on a correlation between the parameter value and the volumetric fluid flow rate of the measuring section; and
  obtaining the total volumetric fluid flow rate by plotting the parameter value obtained in the measuring section on a correlation between the parameter values and the total volumetric fluid flow;
  wherein the measuring section is smaller than the fluid flow passage.

Aspect 7. The method of aspect 6 further comprising:
providing a minimal volumetric fluid flow rate to the fluid flow passage; and
blocking a portion of a cross-section of the fluid flow passage so that the volumetric fluid flow rate measurement obtained in the measuring section when the minimal volumetric fluid flow rate is provided is at a predetermined value.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What is claimed is:

1. A method to measure total volumetric fluid flow rate through a fluid flow passage comprising:
  obtaining a fluid flow parameter value in a measuring section of the fluid flow passage;
  obtaining a volumetric fluid flow rate by plotting the parameter value on a correlation between the parameter value and the volumetric fluid flow rate of the measuring section; and
  obtaining the total volumetric fluid flow rate by plotting the parameter value obtained in the measuring section on a correlation between the parameter values and the total volumetric fluid flow;
  wherein the measuring section is smaller than the fluid flow passage.

2. The method of claim 1 further comprising:
providing a minimal volumetric fluid flow rate to the fluid flow passage; and
blocking a portion of a cross-section of the fluid flow passage so that the volumetric fluid flow rate measurement obtained in the measuring section when the minimal volumetric fluid flow rate is provided is at a predetermined value.

* * * * *